United States Patent
Diorio et al.

(10) Patent No.: US 7,026,935 B2
(45) Date of Patent: Apr. 11, 2006

(54) METHOD AND APPARATUS TO CONFIGURE AN RFID SYSTEM TO BE ADAPTABLE TO A PLURALITY OF ENVIRONMENTAL CONDITIONS

(75) Inventors: Christopher J. Diorio, Shoreline, WA (US); Kurt E. Sundstrom, Woodinville, WA (US)

(73) Assignee: Impinj, Inc., Seattle, WA (US)

( * ) Notice: Subject to any disclaimer, the term of this patent is extended or adjusted under 35 U.S.C. 154(b) by 84 days.

(21) Appl. No.: 10/824,049

(22) Filed: Apr. 13, 2004

(65) Prior Publication Data

US 2005/0099269 A1    May 12, 2005

Related U.S. Application Data

(60) Provisional application No. 60/519,031, filed on Nov. 10, 2003.

(51) Int. Cl.
*G08B 13/14*    (2006.01)
(52) U.S. Cl. .............................. 340/572.2; 340/572.1; 340/572.4
(58) Field of Classification Search ............. 340/568.1, 340/572.1, 572.2, 572.4, 539.11, 539.13, 340/539.21, 10.1, 10.3, 10.6, 825.49; 235/375, 235/384, 435
See application file for complete search history.

(56) References Cited

U.S. PATENT DOCUMENTS

| | | | |
|---|---|---|---|
| 3,938,316 A | 2/1976 | Morokawa et al. | |
| 4,454,483 A | 6/1984 | Baylor | |
| 5,117,756 A | 6/1992 | Goffin, II | |
| 5,583,819 A | 12/1996 | Roesner et al. | |
| 5,649,295 A | 7/1997 | Shober et al. | |
| 5,867,535 A | 2/1999 | Phillips et al. | |
| 5,912,632 A | 6/1999 | Dieska et al. | |
| 5,940,006 A * | 8/1999 | MacLellan et al. | 340/10.1 |
| 5,952,922 A | 9/1999 | Shober | |
| 6,043,748 A | 3/2000 | Touchton et al. | |
| 6,046,683 A | 4/2000 | Pidwerbetsky et al. | |
| 6,127,928 A * | 10/2000 | Issacman et al. | 340/572.1 |
| 6,243,013 B1 | 6/2001 | Duan et al. | |
| 6,356,161 B1 | 3/2002 | Nolan et al. | |
| 6,388,532 B1 | 5/2002 | Babcock | |
| 6,404,325 B1 | 6/2002 | Heinrich et al. | |
| 6,472,943 B1 | 10/2002 | Soong et al. | |

(Continued)

FOREIGN PATENT DOCUMENTS

WO    WO-02065380 A2    8/2002

(Continued)

OTHER PUBLICATIONS

Finkenzeller, Klaus, "Fundamental Operating Principles", *RFID Handbook; Fundamentals and Applications in Contactless Smart Cards and Identification*, John Wiley & Sons, Ltd ; ISBN 0-470-84402-7,(2003),29-59.

*Primary Examiner*—Van T. Trieu
(74) *Attorney, Agent, or Firm*—Schwegman, Lundberg, Woessner & Kluth, P.A.

(57) ABSTRACT

An RFID integrated circuit includes a demodulator to receive a first signal, the first signal having been generated by an RFID reader responsive to detection of a first environmental condition. The RFID integrated circuit further includes a controller to set, based on the first signal, a modulation format for the RFID integrated circuit and to configure the RFID integrated circuit to modulate a backscatter signal according to the modulation format.

22 Claims, 14 Drawing Sheets

U.S. PATENT DOCUMENTS

| | | |
|---|---|---|
| 6,639,509 B1 | 10/2003 | Martinez |
| 6,784,789 B1 * | 8/2004 | Eroglu et al. .............. 340/10.6 |
| 6,917,291 B1 * | 7/2005 | Allen ...................... 340/572.1 |
| 2002/0167405 A1 | 11/2002 | Shanks et al. |
| 2005/0099270 A1 | 5/2005 | Diorio et al. |

FOREIGN PATENT DOCUMENTS

| | | |
|---|---|---|
| WO | WO-05048312 A2 | 5/2005 |
| WO | WO-05048612 A1 | 5/2005 |

* cited by examiner

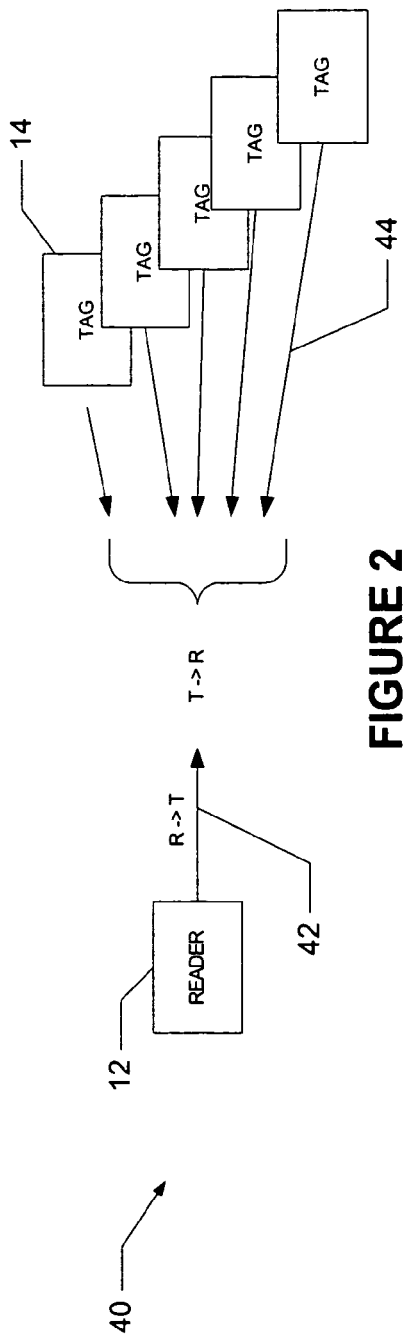
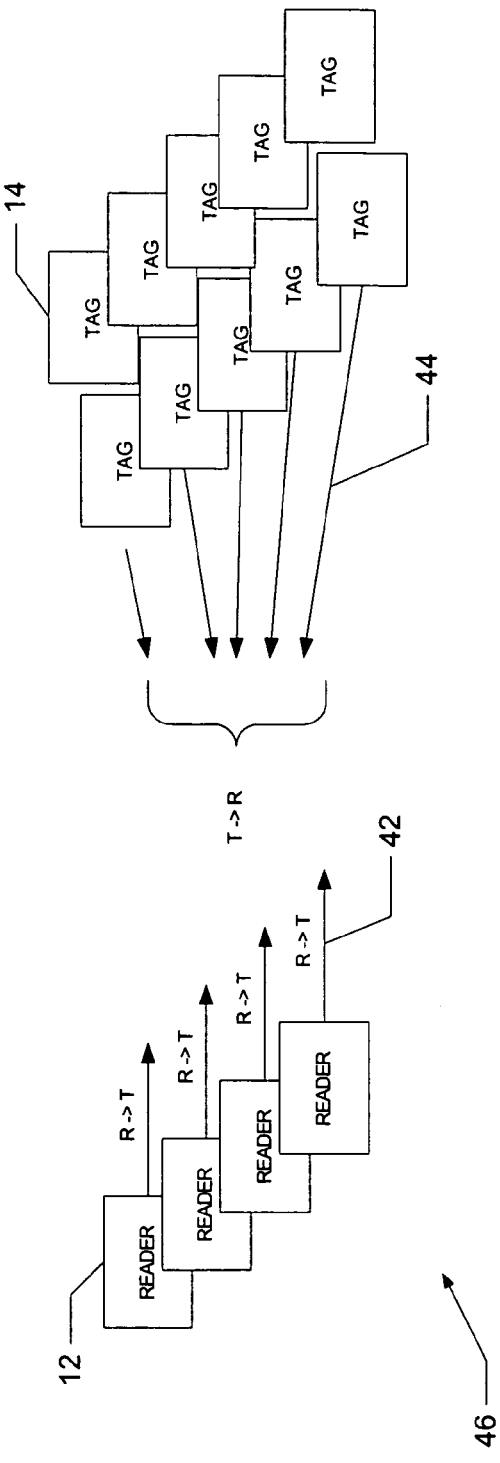

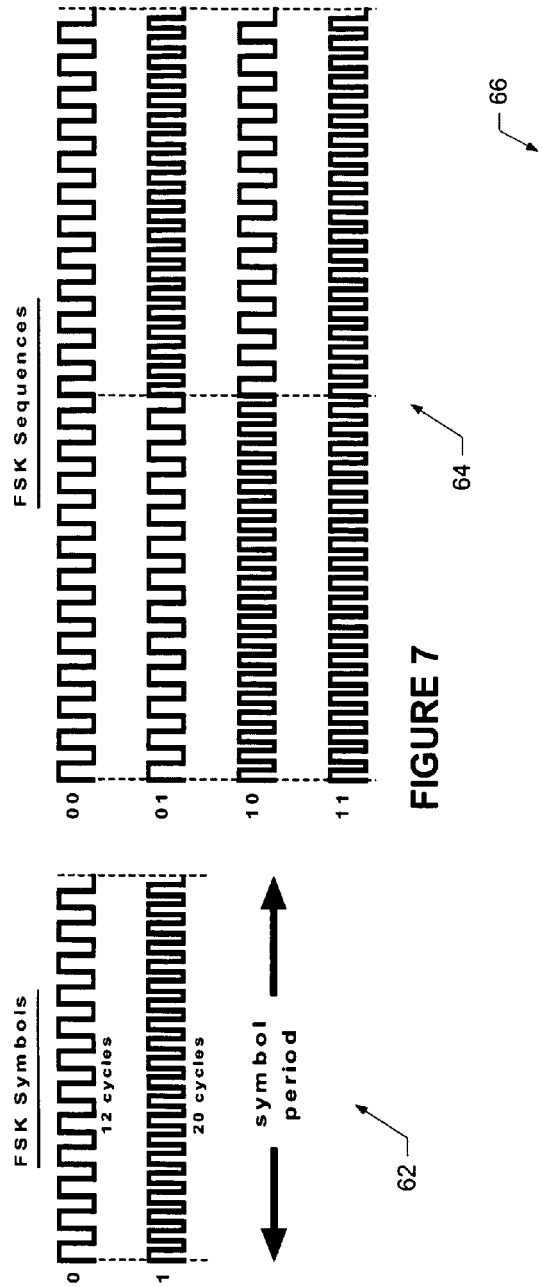
FIGURE 7
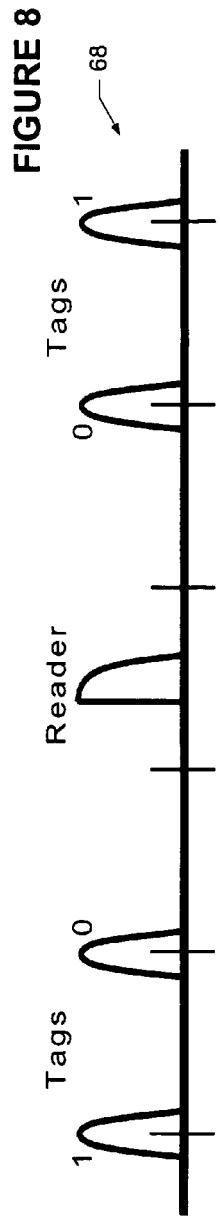
FIGURE 8
FIGURE 9

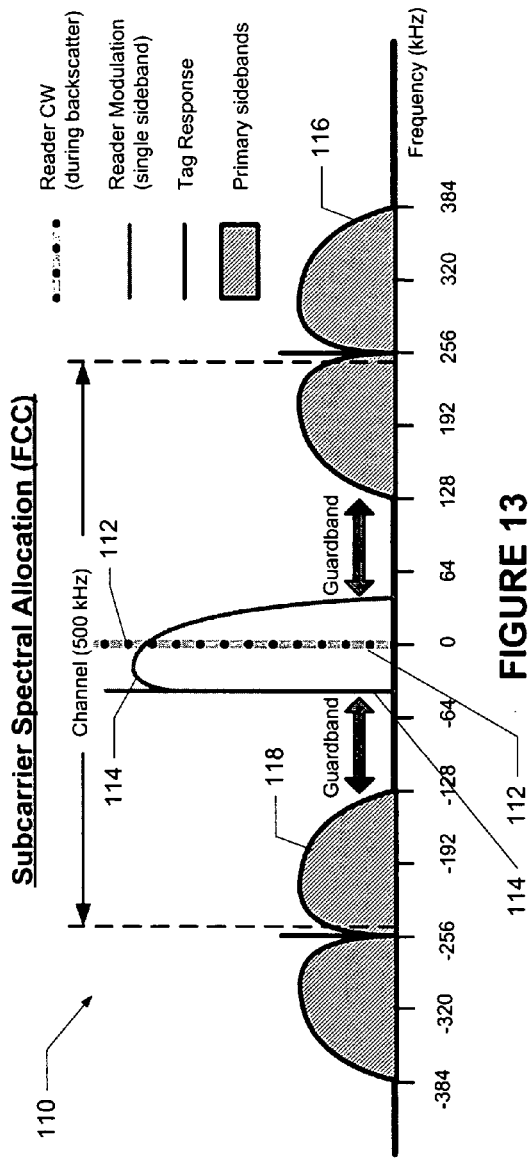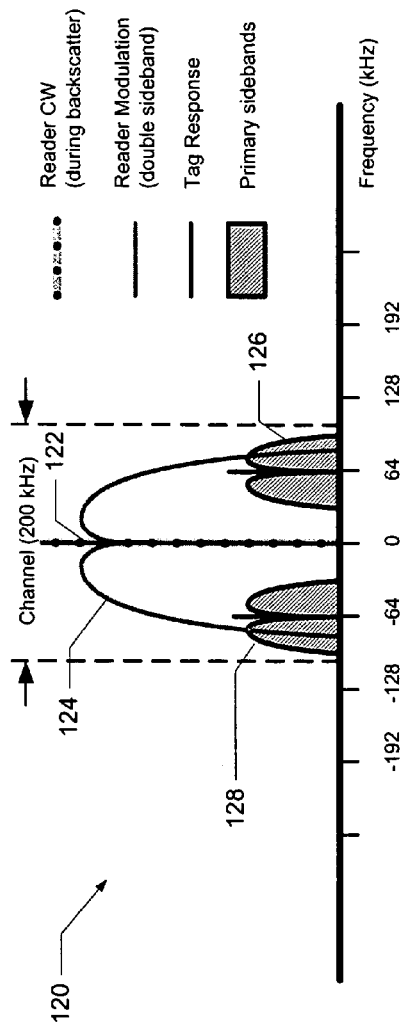

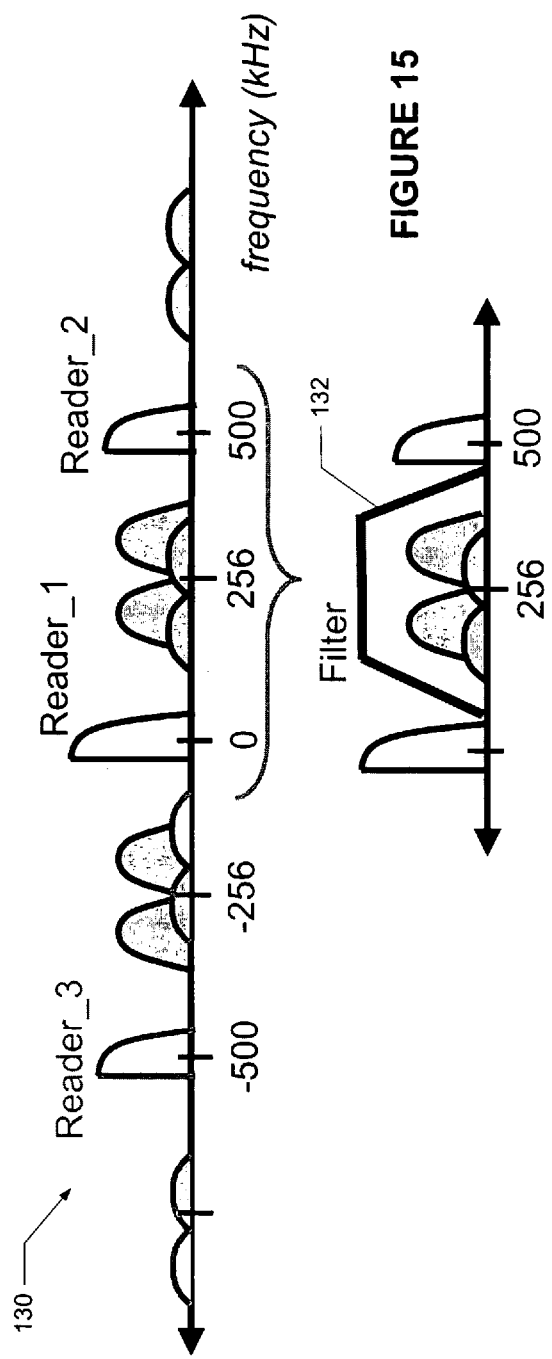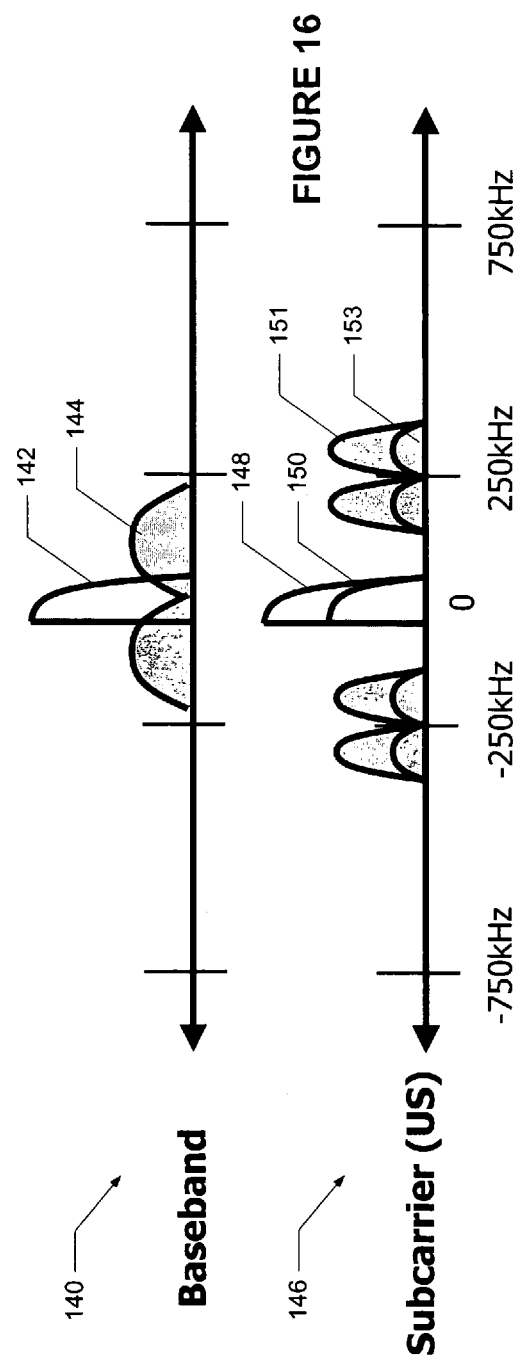

METHOD AND APPARATUS TO CONFIGURE AN RFID SYSTEM TO BE ADAPTABLE TO A PLURALITY OF ENVIRONMENTAL CONDITIONS

The present patent application claims the priority benefit of the filing date of U.S. Provisional Application No. 60/519,031 filed Nov. 10, 2003, which is incorporated herein by reference.

FIELD OF THE INVENTION

An embodiment relates generally to the field of wireless communications and, more specifically, to wireless communications in a radio-frequency identification (RFID) system.

BACKGROUND OF THE INVENTION

Radio-frequency identification (RFID) systems are being increasingly deployed to items for a wide variety of purposes and in a wide variety of environments. For example, RFID systems are increasingly being deployed within supply chains to track inventory from manufacturing through to retail distribution, for example. RFID systems are also being utilized to identify and track airline baggage within airports, to identify motor vehicles at toll gates and parking structures, and to track animals and people (e.g., to track animals within an agricultural operation, and to track children at theme parks or other public venues).

RFID systems may of course be deployed in a wide variety of environments, from a factory floor to a theme park. Certain environments have proved to be more challenging for the successful deployment of an RFID system. For example, in certain environments, a number of RFID readers and RFID tags may be utilized within a close proximity, resulting in a "noisy" radio-frequency environment in which a great deal of interference between competing signals may exist. Furthermore, RF noise and interference may be introduced into a particular operating environment by other devices (e.g., cellular or mobile telephones, microwave devices, etc.). Also worth noting is that different geographic locations may be subject to different radio-frequency transmission regulations. For example, in North America, for ultra-high frequency (UHF) RFID systems, (i.e., RFID systems utilizing the unlicensed 900 MHz radio-frequency band), regulatory restrictions allow for 50 channels, each channel being 500 kHz wide, and require that RFID readers must hop to a new channel every 400 ms. Furthermore, reader synchronization is disallowed. On the other hand, in Europe only 10 channels are allowed by the proposed ETSI 302 208 standard, each of these channels being 200 kHz wide, and RFID reader synchronization is allowed.

In short, it will be appreciated that a number of technical challenges exist with respect to the wide variety of environments, and associated environmental conditions, within which RFID systems may be required to operate. U.S. Pat. No. 5,649,295 to R. Anthony Shober, entitled document "DUAL MODE MODULATED BACKSCATTER SYSTEM" describes, as indicated by the title, a dual mode backscatter system. This document, in the background section, discusses the undesirability of a "single-mode" RFID tag that is capable of operating at either long-range mode or at higher bit rate mode, rather than being capable of operating in both modes. The document then goes on to describe a tag unit of an RFID system that has the capability to operate in a "dual mode" fashion. Specifically, a tag, based on a command from an interrogator, responds to the interrogator with either a "single tone" acknowledgement (to achieve great range) or with an information signal (for greater data rates at lesser range). The RFID system is further described in this patent as having the ability to communicate using the well-known Time-Division Duplex (TDD), Half Duplex or Full Duplex techniques.

SUMMARY OF THE INVENTION

According to one embodiment, there is provided an RFID integrated circuit including a demodulator to receive a first signal, the first signal having been generated by an RFID reader responsive to detection of a first environmental condition. The RFID integrated circuit further includes a controller to set, based on the first signal, a modulation format for the RFID integrated circuit and to configure the RFID integrated circuit to modulate a backscatter signal according to the modulation format.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2 is a diagrammatic representation of a sparsely populated RFID environment within which a single RFID reader is shown to provide a reader-to-tag transmission to a limited population of RFID tags.

FIG. 3 is a diagrammatic representation of a densely populated environment, in which multiple RFID readers communicate, via respective reader-to-tag transmissions, with a large population of RFID tags.

FIG. 7 shows exemplary timing diagrams illustrating FSK symbols and FSK sequences, respectively.

FIG. 8 illustrates a table showing transmission rates, and modulation formats, that may be utilized for forward transmissions and backscatter transmissions in U.S. and European geographic regions for FSK-modulated backscatter transmissions.

FIG. 9 is a frequency diagram, illustrating exemplary FSK spectral allocations corresponding to transmission rate and format parameters provided in the table of FIG. 8.

FIG. 13 is a frequency diagram illustrating an exemplary subcarrier spectral allocation conforms to the FCC regulatory requirements.

FIG. 14 shows a frequency diagram illustrating a subcarrier spectral allocation in terms of regulations provided by the CEPT to be effective within Europe.

FIG. 15 shows a frequency diagram that provides an illustration of how subcarrier format modulation of backscatter signals may be utilized to reduce reader-on-tag collisions within a North American environment, in which channel-hopping is permitted.

FIG. 16 shows first and second frequency diagrams, the first frequency diagram illustrating a spectral allocation within a low-density environment, and the second frequency diagram illustrating a spectral allocation in a dense-readout RFID environment in which at least two, co-channel RFID readers are deployed.

DETAILED DESCRIPTION

A method and an apparatus to configure an RFID system to be adaptable to a plurality of environmental conditions are described. In the following description, for purposes of explanation, numerous specific details are set forth in order to provide a thorough understanding of the present invention. It will be evident, however, to one skilled in the art that the present invention may be practiced without these specific details.

Figure 1:
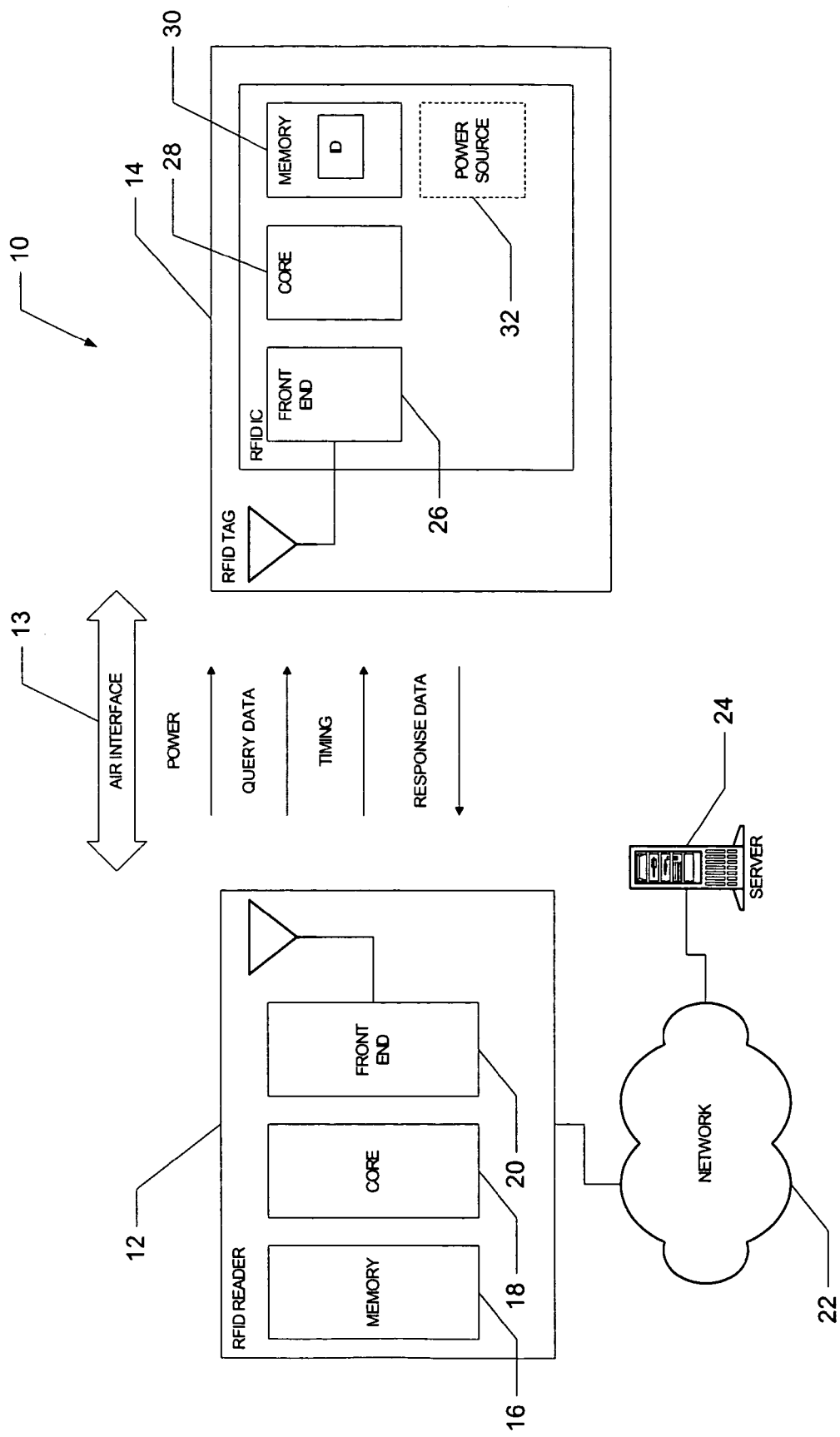
FIG. 1 is a diagrammatic representation of an exemplary RFID system, within which an embodiment of the present invention may be implemented.

FIG. 1 is a diagrammatic representation of an exemplary RFID system 10, within which an embodiment of the present invention may be implemented. The RFID system 10 includes an RFID reader 12 that transmits information, via a wireless air interface 13, to one or more RFID tags 14. The air interface 13 enables the RFID reader 12, as shown, to provide power, query data and timing information to an RFID tag 14, responsive to which the RFID tag 14 may provide response data. Specifically, the RFID tag 14 may to scavenge power from a received radio-frequency (RF) signal, and may backscatter the response data to the RFID reader 12 by modulating the impedance of an associated antenna. In a half-duplex communications embodiment, during a reader-to-tag transmission, the RFID reader 12 may modulate an RF waveform with information (e.g., bits). During a tag-to-reader transmission, the RFID reader 12 transmits a Continuous-Wave (CW) radio signal. The RFID tag 14 then backscatter-modulates the CW signal with bits, creating a radio-frequency (RF) information waveform that is transmitted back to the RFID reader 12.

Dealing now specifically with the RFID reader 12, this device is shown to include a memory 16 within which to store various algorithms and information, a core 18 (e.g., a controller or processor) that operates to control operations of the RFID reader 12, and a front end 20, coupled to an antenna, to control the transmission of information via the air interface 13 by an antenna, and also to process backscatter information received via the air interface 13 by the antenna.

In one exemplary deployment, the RFID reader 12 may be coupled (e.g., via a network 22) to a further computer system, such as a server 24. This allows for the programming and/or control of the RFID reader 12 by the server 24. Further, the RFID reader 12 can provide data, via the network 22, to the server 24 for any one of a multitude of purposes. For example, multiple RFID readers 12 may be coupled to a computer system, such as the server 24, so as to provide the server 24 with a comprehensive view of a particular environment. Consider the exemplary environment in which multiple RFID readers 12 are deployed at the various locations within a warehouse. In this deployment, each of the RFID readers 12 may be coupled via a network 22 (e.g., a wired or wireless network) to one of more servers 24, so as to provide a warehouse operator with RFID access to multiple locations within a warehouse, and/or across multiple warehouses.

The RFID tag 14 may be a combination of an RFID circuit (e.g., an RFID Integrated Circuit (IC)), and a coupled antenna (or antennae) to facilitate the reception and transmission of radio-frequency signals via the air interface 13. The RFID circuit and the antenna are typically located on a base material or substrate (e.g., a plastic or paper material) to thereby constitute the RFID tag 14. The RFID tag 14 is shown in FIG. 1 to include a number of subcomponents, any one or more of which may be implemented on one or more integrated circuits that form part of the RFID tag 14. Specifically, the RFID tag 14 is shown to include a front end 26 that includes components to facilitate the processing of radio-frequency signals received via the coupled antenna, and also to facilitate the transmission of a radio-frequency signal (e.g., a modulated backscatter signal) via the coupled antenna. A core 28 operates to control operations and states of the RFID tag 14, while a memory 30 stores, inter alia, a tag identifier, a product identifier, configuration values applicable to configuration of the RFID tag 14 and possibly one or more algorithms. As noted above, the RFID tag 14 may be a "passive" tag that scavenges power from a radio-signal received via the air interface 13. Alternatively, the RFID tag 14 may be an "active" tag and include a power source 32 to power the RFID tag 14.

The air interface 13 may furthermore facilitate both full and half duplex communications. Further, while embodiments are described herein as utilizing radio-frequency signals to communicate, it will be appreciated that other forms of wireless communication may be utilized. For example, in various embodiments, the coupling between the RFID reader 12 and the RFID tag 14 may be achieved utilizing inductive coupling, close coupling, or electrical coupling.

As mentioned above, an RFID reader 12 may be deployed in a wide variety of environments, certain of which may include high levels of RF noise and interference, or may be subject to certain regulatory restrictions and requirements. FIG. 2 is a diagrammatic representation of sparsely populated RFID environment 40 in which a single RFID reader 12 provides a reader-to-tag transmission 42 to a limited population of RFID tags 14. The population of tags 14, responsive to receipt of the transmission 42, provides multiple tag-to-reader transmissions 44 back to the RFID reader 12.

FIG. 3 is a diagrammatic representation of a densely populated environment 46, in which multiple RFID readers 12 communicate, via respective reader-to-tag transmissions 42, to a larger population of RFID tags 14. Each of the RFID tags 14 in turn responds with an appropriate tag-to-reader transmission 44. In the densely populated environment 46, the RFID readers 12 will receive RF signals from the larger population of RFID tags 14, as well as from co-located RFID readers 12. Further, certain of the RFID readers 12 may, at any one time, be transmitting on the same channel as a further RFID reader (i.e., at least two RFID readers 12 may constitute co-channel readers). Thus, RF noise and interference levels in the densely populated environment 46 may be significantly higher than in the sparsely populated environment.

As a result of varying RF noise and interference conditions within varying environments (e.g., a sparsely populated environment versus a densely populated environment), it is advantageous to utilize different communication protocols in different environments to insure the reliability of data transmissions. However, as the RF noise and interference levels increase within an environment, the choice of protocol required to insure the reliability of communications may negatively impact throughput. For example, within the sparsely populated environment 40, it may be desirable to select a protocol for communications between the RFID reader 12 and the population of RFID tags 14 that can achieve a relatively higher throughput as a result of the lower RF noise and interference levels within the environment 40. On the other hand, in the densely populated environment 46, it may be desirable to select a protocol that insures reliable communications in a noisy environment 46, but at the cost of throughput efficiency.

One embodiment disclosed herein proposes an RFID system in which a modulation format, for example a backscatter modulation format, is chosen (or selected) based on environmental conditions, such as noise interference, reader/tag density, geographic location etc. Accordingly, in one embodiment, a first modulation format is utilized to modulate a backscatter signal within a RFID system, responsive to the detection of a first environmental condition, and a second modulation format is utilized to modulate a backscatter signal responsive to detection of a second environmental condition. For example, consider that in the sparsely populated environment 40, where RF noise and interference levels are low, it may be desirable to configure an RFID system to modulate a backscatter signal utilizing a baseband modulation format, such as, for example, a biphase (e.g., FMØ), a Manchester, or a Pulse Width Modulation (PWM) modulation format.

Figure 4:
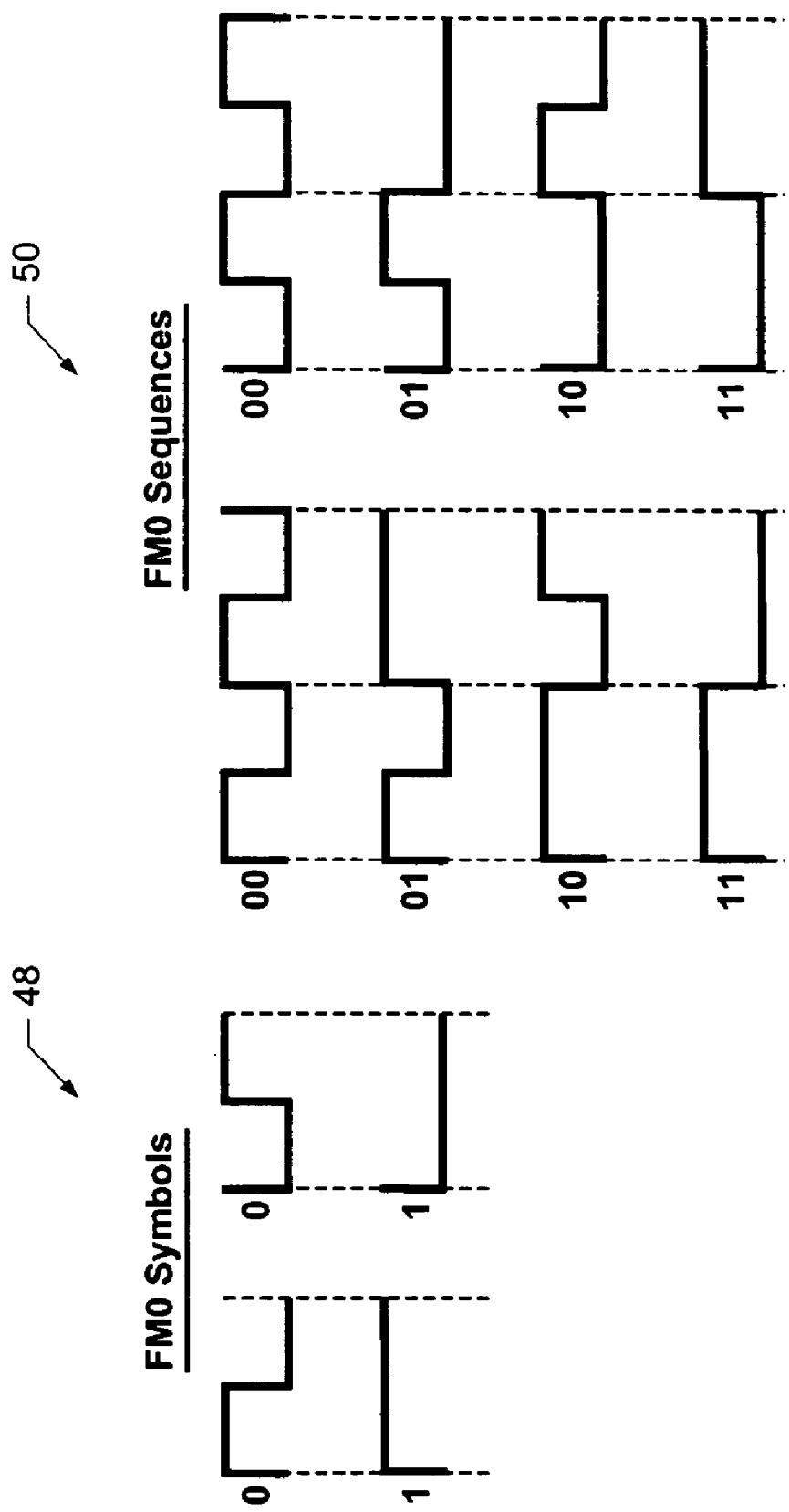
FIG. 4 illustrates two exemplary timing diagrams, depicting FM Zero symbols and FM Zero sequences, respectively.

Considering the example of utilizing an FMØ modulation format to modulate a backscatter signal within an RFID system, reference is made to FIG. 4 that shows exemplary timing diagrams 48 and 50 illustrating FMØ symbols and FMØ sequences respectively. FMØ modulated backscatter provides for a linear modulation with memory and biorthogonal basis functions. Collision detection is performed utilizing edge detection and FMØ memory errors. FMØ-modulated backscatter is attractive in a sparsely populated environment 40, as it provides in-channel signaling and provides an increased transmission rate (e.g., bits/Hz), relative to certain other modulation formats that may be applied to a backscatter signal.

Figure 5:
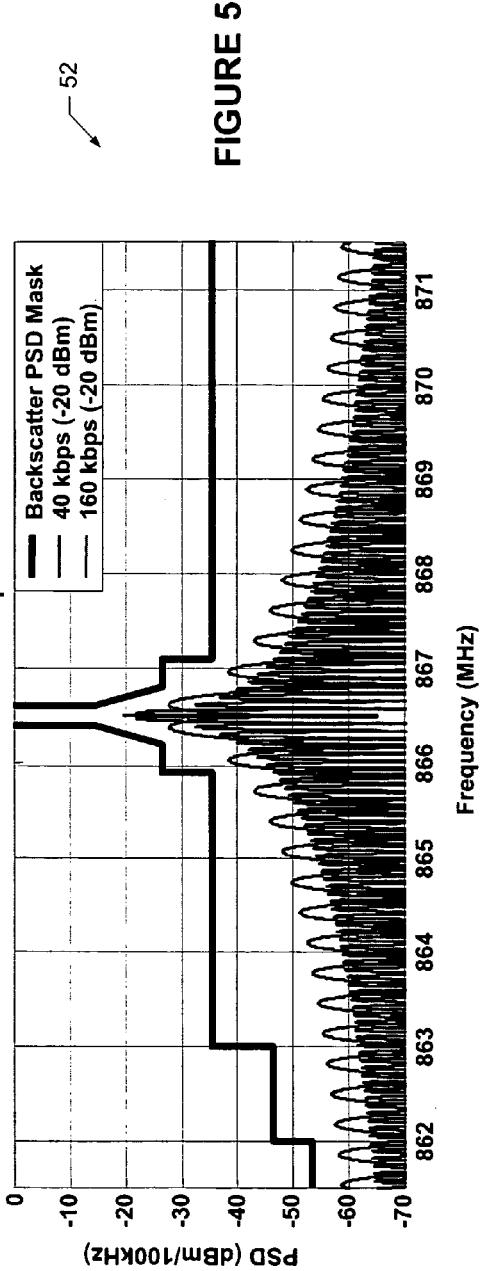
FIG. 5 illustrates a spectral density diagram, plotting Power Spectral Density against frequency for an exemplary RFID system employing a biphase modulation format.

FIG. 5 illustrates a spectral density diagram 52, plotting Power Spectral Density (PSD) against frequency (MHz) for an RFID system employing a biphase modulation format, and illustrates the PSD for data rates of 40 kbps and 160 kbps. This modulation format is useful in certain geographical areas, for example in Europe, in order to meet the regulatory conditions for generated RF emissions as shown in the PSD mask of FIG. 5. This modulation scheme is not required in order to meet spectral emission in North America. A reader and tag system capable of communicating using this scheme and other modulation format would have utility both in North America and Europe.

Figure 6:
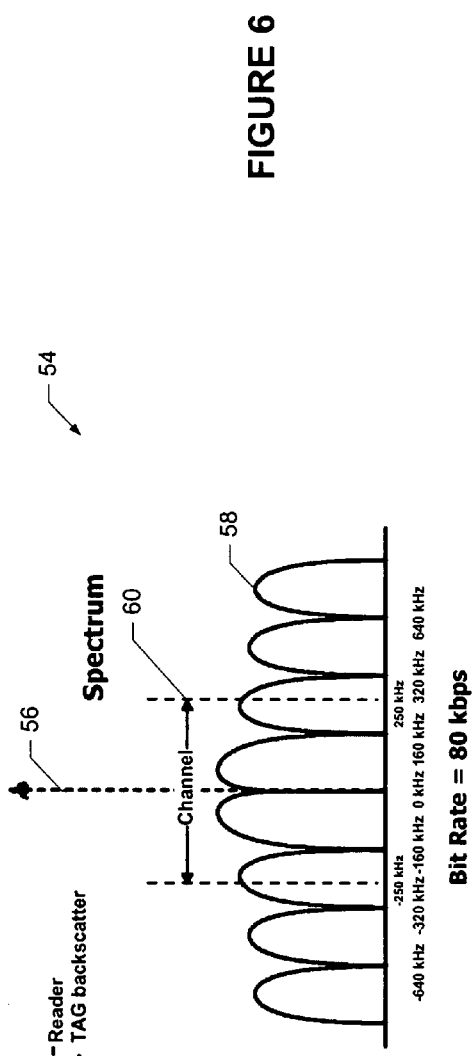
FIG. 6 is a frequency diagram illustrating various frequency signals within an exemplary RFID system employing baseband modulation format to modulate a backscatter signal.

FIG. 6 is a frequency diagram illustrating various frequency signals within an exemplary RFID system employing baseband modulation to modulate a backscatter signal. The frequency of a forward link continuous wave (CW) signal (transmitted during tag-to-reader communications) is illustrated at 56 in broken line, and the frequencies of tag response signals are illustrated at 58 in solid line. It will be noted from FIG. 6 that the frequencies of the response signals are close to the frequency of the reader continuous wave (CW) signal 54. Accordingly, while a baseband modulation format for backscatter modulation may be useful for achieving a relatively higher throughput, interference may arise (e.g., within the channel 60 illustrated in FIG. 6), where multiple RFID readers are co-located within a particular environment. Further, as the backscatter signal frequency is close to the frequency of the reader transmission signal, interference between multiple readers and a tag population may be more acute when utilizing baseband modulation.

Having considered the use of a baseband modulation format within a sparsely populated environment, it is useful to consider how a different modulation format, such as a subcarrier modulation format (e.g., a bi-tone or a Frequency Shift Key (FSK) modulation format) may be better suited to utilization within the densely populated environment 46. To this end, FIG. 7 shows exemplary timing diagrams 62 and 64 illustrating FSK symbols and FSK sequences respectively. As an example of a subcarrier modulation format, FSK modulation utilizes two tones to represent a digital one and digital zero, respectively. Collision detection is performed by observing the relevant two tones that are utilized by the FSK modulation format. For example, where a 2.2 MHz tone is utilized to represent a digital zero and a 3.3 MHz tone is utilized to represent a digital one, the simultaneous transmission of backscatter signals utilizing these tones registers a collision. FSK-modulated backscatter is advantageous in that it facilitates increased reader sensitivity relative to FM0 modulation formats, and accordingly may be better suited to a dense reader environment.

Dealing more specifically with dense reader environments, it is, according to one embodiment, desirable to provide RFID readers that are able to be co-located, and operate in a co-channel manner, with other RFID readers in a dense RFID reader environment. Again, it should be borne in mind that different regulatory requirements may apply in different geographic regions. While North American regulations permit RFID readers to perform channel hopping, and in this way at least partially avoid certain of the issues presented by co-located readers, under European regulations, channel hopping readers is disallowed. However, European regulations do permit RFID reader synchronization.

As noted above, an issue exists with respect to baseband modulation of a backscatter signal in that the reader-to-tag, and tag-to-reader, transmissions share a common channel (e.g., the channel 60 shown in FIG. 6). As the reader-to-tag transmissions are typically of a much larger amplitude than the tag-to-reader backscatter transmissions (e.g., in the order of 100 dB larger), the potential exists for a distant in-channel RFID reader to mask nearby RFID tags. For this reason, an interleaved subcarrier FSK signaling (or modulation format) provides an advantage in that RFID reader and tag transmissions utilize different frequencies. Accordingly, tag transmissions may collide with other tag transmissions, but not necessarily with reader transmissions. Similarly, reader transmissions collide with further reader transmissions, but not with tag transmissions.

FIG. 8 shows a table 66 including transmission rates, and modulation formats, that could be utilized for both forward transmissions (i.e., reader-to-tag transmissions), and backscatter transmissions (i.e., tag-to-reader transmissions) in the US and European geographic regions for FSK-modulated backscatter transmissions. FIG. 9 is a frequency diagram 68, illustrating exemplary FSK spectral allocations corresponding to the transmission rate and format parameters provided in the table 66 of FIG. 8.

Figure 10:
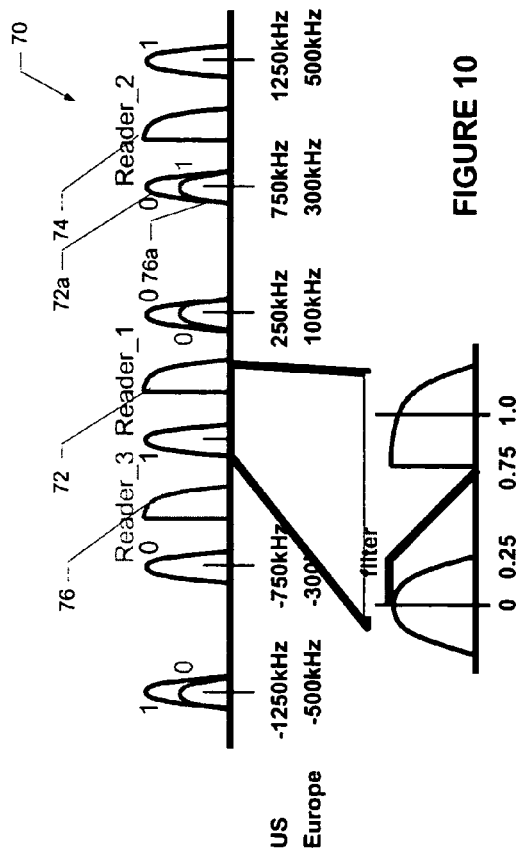
FIG. 10 is a frequency diagram illustrating a spectral distribution within an exemplary dense reader environment, in which three co-located RFID readers perform channel hopping.

FIG. 10 is a frequency diagram 70 illustrating a spectral distribution in an exemplary dense reader environment, in which three co-located RFID readers perform channel hopping, and in which the tag population is configured to employ the FSK modulation format to modulate backscatter signals. The three co-located RFID readers 12 employ channel hopping so as to minimize reader-tag collisions. Specifically, a first RFID reader 12 transmits a reader-to-tag signal 72 in a first half channel, a second RFID reader 12 transmits a reader-to-tag signal 74 in a second half channel, and a third RFID reader 12 transmits a reader-to-tag signal 76 in a third half channel. The respective RFID readers 12 may, in the provided example, have hopped to the described channels responsive to the detection of another RFID reader 12 operating in any one of a number of channels. For example, the second reader, transmitting the reader-to-tag signal 74, may have initially attempted to commence transmission in the first half channel but have detected that the first reader was already transmitting the reader-to-tag signal 72 within that channel (e.g., utilizing collision detection), and accordingly have hopped to the second half channel.

FIG. 10 also illustrates that the channels within which the co-located readers transmit the reader-to-tag signals 72, 74 and 76 are spaced, and the population of RFID tags 14 are configured to backscatter at frequencies such that readers each transmit at a frequency that does not collide with further reader transmissions, and such that tag transmissions collide with other tag transmissions. Specifically, with reference to the exemplary transmissions illustrated in FIG. 10, it will be noted that the reader-to-tag signals 72, 74 and 76 do not collide, whereas the backscatter signals 72a and 76a do, for example, collide. This configuration of an RFID system reduces the path losses as a result of tag-to-tag transmission collisions.

Figure 11:
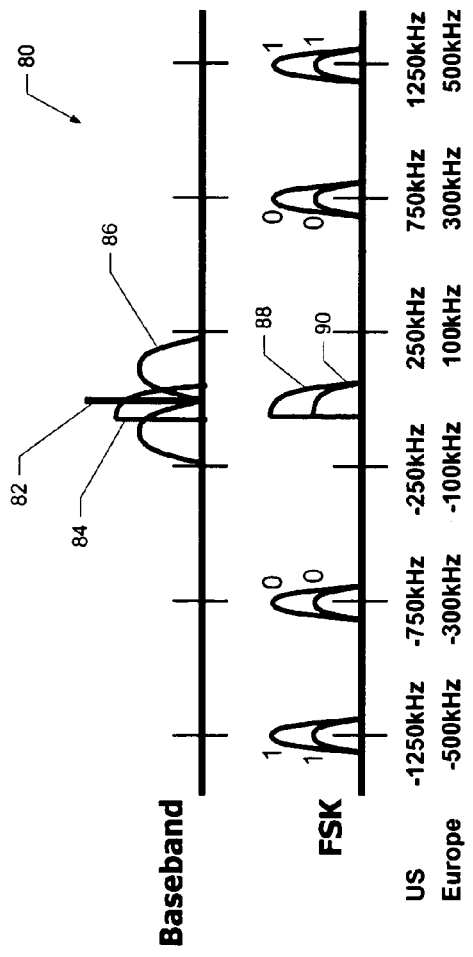
FIG. 11 includes a respective baseband and FSK frequency diagrams, illustrating a contrast between situations in which an RFID system is configured to use a baseband modulation format and a non-baseband modulation format to modulate backscatter signals from a population of RFID tags.

FIG. 11 shows respective baseband and FSK frequency diagrams 80, illustrating the contrast between situations in which an RFID system is configured to use a baseband modulation format and a non-baseband (e.g., a FSK) modulation format to modulate backscatter signals from a population of RFID tags 14. Dealing first with the frequency diagram for the baseband modulation format scenario, a particular RFID reader 12 is shown to transmit a CW signal 82, which collides with the reader-to-tag signal 84 transmitted by a further co-channel RFID reader 12. A backscatter signal 86 is shown to be modulated utilizing a baseband modulation format. Accordingly, RFID reader and tag transmissions are shown to collide.

The FSK frequency diagram serves to illustrate that baseband signaling does not lend itself to co-channel readers (particularly in a dense reader environment), whereas FSK signaling does better accommodate co-channel readers in a dense reader environment. The baseband frequency diagram illustrates that reader and tag transmissions collide where baseband signaling is utilized by co-channel readers. On the other hand, where FSK signaling is utilized, reader transmissions collide with other reader transmissions, and tag transmissions collide with other tag transmissions.

Figure 12:
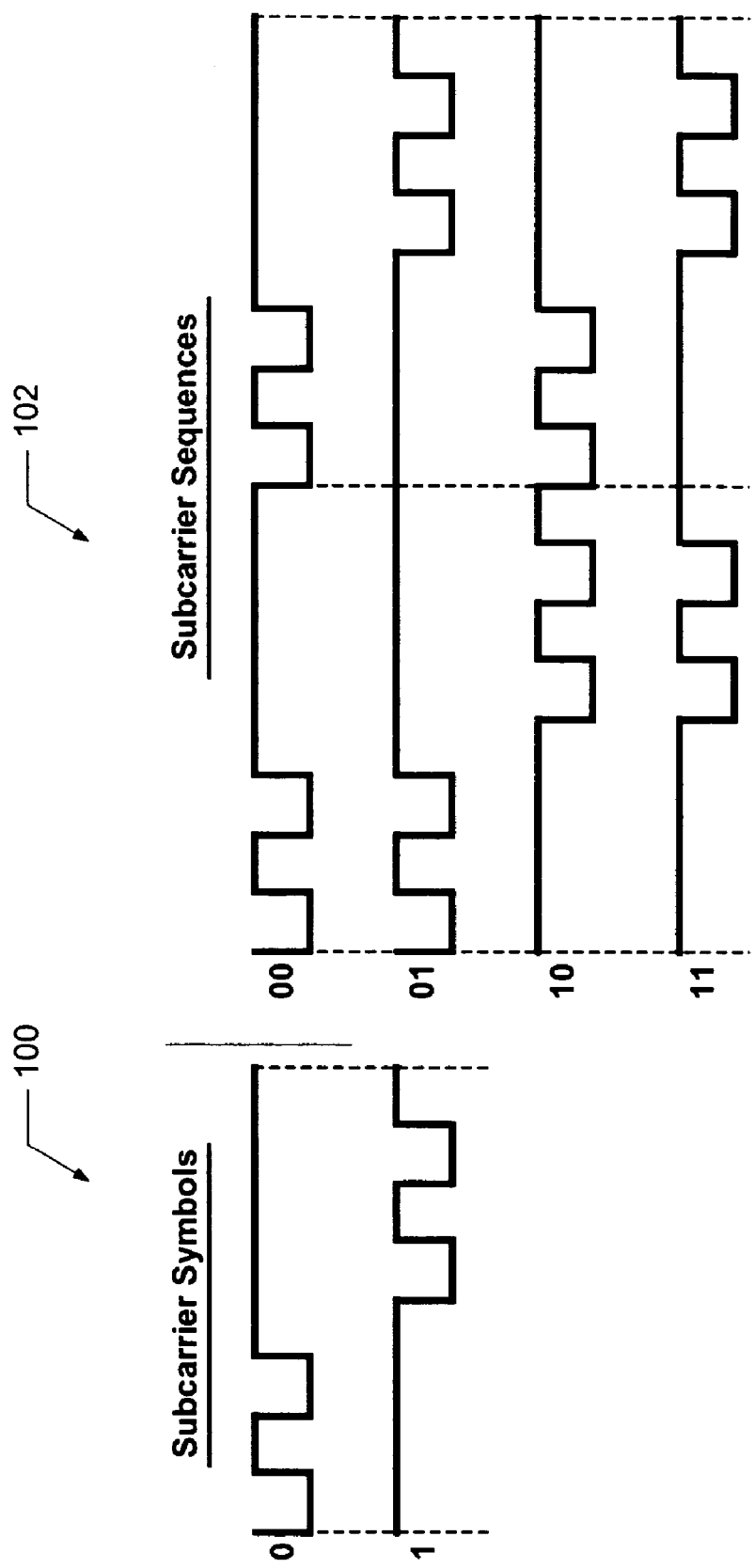
FIG. 12 illustrates exemplary timing diagrams for subcarrier symbols and subcarrier sequences, respectively.

FIG. 12 illustrates exemplary timing diagrams 100 and 102 for subcarrier symbols and subcarrier sequences, respectively. Subcarrier modulation (e.g., Manchester data modulation) may be utilized to modulate a single subcarrier. Subcarrier modulation allows for increased RFID reader sensitivity, and accordingly is useful for deployment in a dense RFID environment.

FIG. 13 is a frequency diagram 110 illustrating an exemplary subcarrier spectral allocation that conforms to the Federal Communications Commission (FCC) regulatory requirements, and shows a CW signal 112 transmitted during tag-to-reader communications. A single sideband reader modulation is shown at 114, with tag responses being shown at 116 and 118 respectively. The forward-link transmissions (e.g., reader-to-tag transmission) may be transmitted at a 40 kbps rate utilizing Manchester format modulation. Backscatter transmissions may be transmitted utilizing a 64 kbps data rate at a 256 kHz subcarrier modulation format. It will be noted that the tag responses 116 and 118 straddle the boundaries of the 500 kHz channel defined in terms of FCC regulations. However, current FCC regulations permit tag responses (e.g., backscatter signaling) out-of-channel, as illustrated in FIG. 13.

The FCC-permitted subcarrier spectral allocation illustrated in FIG. 13 should be contrasted with the spectral allocation illustrated in FIG. 14, which shows a frequency diagram 120 illustrating a subcarrier spectral allocation in terms of regulations provided by the CEPT to be effective within Europe. A CW transmission 122, during tag-to-reader transmission, and a double-sideband reader modulated transmission 124, during reader-to-tag transmission, are each shown. Also shown are tag responses 126 and 128. The tag responses 126 and 128 fall within a 200 kHz channel, in view of the CEPT regulations, which disallow out-of-channel backscatter signaling. The reader-to-tag transmissions may be at a 40 kbps data rate, and utilize the Manchester modulation format to generate the transmission signal 124. The backscatter signals (i.e., the tag responses 126 and 128) may be at a 16 kbps data rate, and utilize a 64 kHz subcarrier modulation format.

It is now useful to consider how the above-described regulatory requirements in different geographic regions (e.g., the US and Europe) impact signaling within an RFID system. Firstly, in Europe, the CEPT regulations allow for synchronization between RFID readers 12. Accordingly, for co-located readers, synchronization can be utilized to avoid reader-on-tag collisions. There is further no tag-on-tag collision since all signaling is in-channel.

In geographic regions in which the FCC regulations apply for co-located RFID readers 12, the utilization of subcarrier modulation formats to modulate backscatter signals reduces reader-on-tag collisions. Further, path losses minimize the impact of tag-on-tag collisions. FIG. 15 shows a frequency diagram 130 that provides an illustration of how subcarrier format modulation of backscatter signals may be utilized to reduce reader-on-tag collisions within a North American environment in which channel-hopping is permitted. FIG. 15 also illustrates how a filter 132 may be utilized to filter out half-channel transmissions from co-located RFID readers 12.

Having above described the situation with co-located readers, co-channel RFID reader scenarios are now described with reference to FIG. 16. A first frequency diagram 140 illustrates a spectral allocation within a low-density environment, in which only a single RFID reader 12 is deployed, and shows a RFID reader transmission 142 as well as tag responses (e.g., backscatter signals) modulated utilizing a baseband modulation format. A second frequency diagram 146 illustrates a spectral allocation in a dense-reader RFID environment in which at least two, co-channel RFID readers are deployed. As shown, the reader transmission signals 148 and 150 collide, as do the tag responses 151 and 153 (e.g., backscatter signals) that are modulated utilizing a subcarrier modulation format. However, it will be noted that reader-on-tag collisions are avoided (e.g., reader transmissions collide with further reader transmissions but not with tag transmissions). Furthermore, path losses reduce the impact of the reader-on-reader collisions (e.g., the collision between the transmission signals 148 and 150). Accordingly, baseband signal, as described above with reference to the frequency diagram 140, is undesirable for RFID environments employing co-channel readers, whereas subcarrier signaling, as illustrated with respect to frequency diagram 146, facilitates the deployment of co-channel RFID readers within a RFID environment.

The above discussion with respect to FIGS. 4–16 illustrates the advantages of utilizing different signal schemes (e.g., modulation formats) in different environments (e.g., low-density versus high-density environments, environments having different regulatory requirements, etc.). Accordingly, an exemplary embodiment of an RFID system includes "multi-mode" RFID tags 14 (e.g., RFID tags 14 that are able to support a number of signaling schemes), and RFID readers 12 that are able to choose and/or specify different signaling schemes according to a variety of environmental conditions. Specifically, an embodiment of an RFID reader 12 is described below that is capable of choosing and/or implementing a signaling scheme that seeks to maximize data rate and throughput in environments that permit such data rates and throughputs, without unacceptably degrading the quality of transmissions, and that is capable of choosing and/or implementing a signaling scheme that seeks to achieve a minimum transmission quality level in environments where an increased data rate (or throughput) is not possible (e.g., in a noisy environment). Specifically, one embodiment described below provides for RFID readers that may choose baseband signaling in low-density (or low-noise) environments, in an attempt to maximize data rate and throughput, but that choose and/or implement non-baseband signaling in high-density (or high-noise) environments. One advantage of implementing non-baseband signaling for high-density environments is that, within such high-density environments, RFID readers 12 may be synchronized or not, depending on regulatory requirements in a specific region. Further, the utilization of non-baseband signaling for high-density environments facilitates the implementation of spectral spacing between the transmissions of RFID readers and RFID tags that allows many reader-to-tag and tag-to-reader signals to co-exist. One further advantage of the utilization of non-baseband signaling for high-density environments is that collision detection that may be provided.

Figure 17:
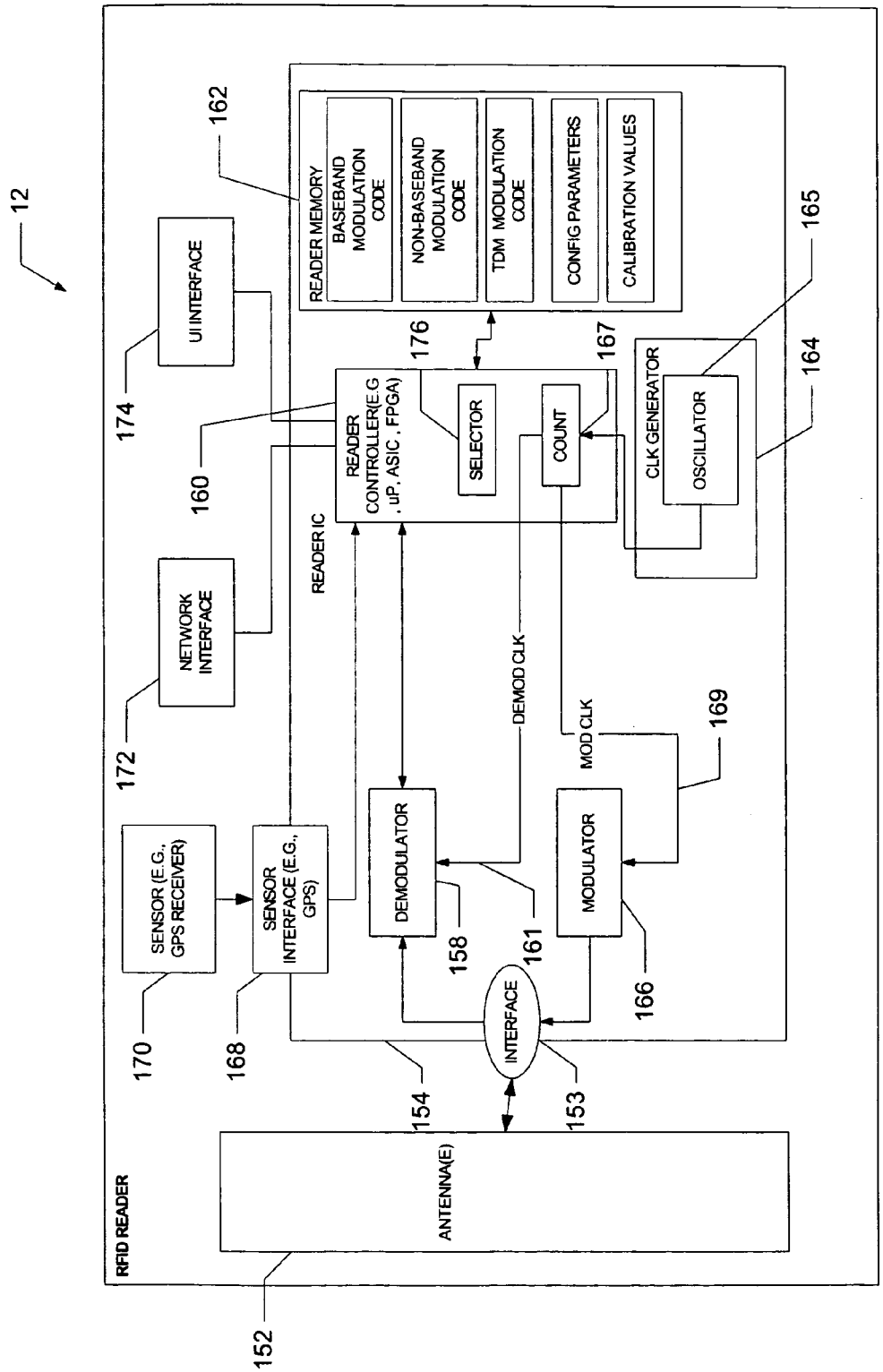
FIG. 17 is a block diagram providing further architectural detail pertaining to an RFID reader, according to one exemplary embodiment.

FIG. 17 is a block diagram providing further architectural detail pertaining to an RFID reader 12, according to one exemplary embodiment. The RFID reader 12 includes one or more interfaces to receive input indicating at least one of a number of environmental conditions pertaining to an environment in which the RFID reader 12 is to operate, and a controller 160 to select a modulation format, from a number of supported modulation formats, based on the received input, to configure the RFID reader 12 to at least demodulate a received backscatter radio-frequency signal utilizing the selected modulation format. The interfaces are coupled a number of input sources (e.g., an antennae interface 153 is coupled to one or more antennae 152) that provide an input signal (e.g., corresponding to a received radio-frequency signal) to a reader integrated circuit (IC) 154. The RFID reader 12 is shown to also include a sensor interface 168 to receive input from one or more sensors 170 that may be included within the RFID reader 12 or alternatively may be external to the RFID reader 12, but be coupled (e.g., via a wired or wireless link) to the sensor interface 168. In one embodiment, the sensor 170 may be a GPS device that provides location information, identifying a present location of the RFID reader 12, via the sensor interface 168 to the reader integrated circuit 154.

The RFID reader 12 may also include a network interface 172, so that to enable the RFID reader 12 to be coupled (e.g., utilizing a wired or wireless link) to one or more further computer systems that communicate with the RFID reader 12 for a number of purposes. For example, a computer system coupled by the network interface 172 to the RFID reader 12 may provide operational data (e.g., configuration parameters) to the RFID reader 12, and also receive information (e.g., tag population count and identification information) from the RFID reader 12. A user interface 174 further allows a human operator to provide input to, and receive output from, the RFID reader 12. For example, a human operator may need to configure the RFID reader 12 according to conditions and regulations applicable to a particular deployment environment. The user interface 174 may also be utilized to communicate information (e.g., tag population counts and identification information) to a human operator of the RFID reader 12. To this end, the user interface 174 may be coupled to a display (e.g., an LCD or the like) or audio device to facilitate the presentation of information to a human operator.

Turning now specifically to the reader integrated circuit 154, signals received via the antennae interface 153 (e.g., a pad) are provided to a demodulator 158 that demodulates the received input signal, and provides digital information to a reader controller 160 (e.g., a microprocessor, Application Specific Integrated Circuited (ASIC), a Floating Point Gate Array (FPGA) circuit, etc.). The digital information provided by the demodulator 158 to the controller 160 may include a response identifier, as well as response information return to the RFID reader 12 from any one of a number of RFID tags 14 included within an interrogated population. For example, the response data may include a product identifier (e.g., an Electronic Product Code (EPC) stored within an interrogated RFID tag 14.

FIG. 17 also illustrates that a reader memory 162 is coupled to the controller 160 and stores one or more code modules that may be retrieved by the controller 160 for execution, so as to enable the controller 160 to control operation of the RFID reader 12 in accordance with an appropriate code module. For example, the reader memory 162 may store baseband, non-baseband and Time Division Multiplex (TDM) modulation code modules (or at least modulation values) so as to appropriately configure the controller 160. For example, the various stored modulation code modules may be executed so as to enable the controller 160 to output an appropriate switch signal (e.g., a demodulator clock signal 161) to the demodulator 158.

The reader integrated circuit 154 is also includes clock generation circuitry 164, which includes a Digitally Controlled Oscillator (DCO) 165. In one embodiment, the oscillator 165 may be calibrated utilizing one or more oscillation values stored within the reader memory 162. The oscillator 165 outputs a frequency signal to the controller 160 that employs a count function (or circuit) 167 to generate one or more clock signals (e.g., the demodulator clock signal 161 and a modulator clock signal 169).

The controller 160 is also shown to be coupled to a modulator 166, so as to facilitate the provision of the modulator clock signal 169.

Operation of the RFID reader 12 includes the generation of one or more commands, and associated data and configuration values, for inclusion within a reader-to-tag transmission. For example, an issued command may be a query command to elicit certain information from a population of interrogated RFID tags 14. Further, the query command may include one or more configuration parameters (e.g., to configure an interrogated RFID tag 14 to respond utilizing one of a number of modulation formats). The controller 160 is also shown to include a selector 176 that operationally may select a modulation format for reader-to-tag transmissions, and for tag-to-reader transmissions, based on one or more inputs, potentially indicative of environmental conditions pertaining to a deployment environment. To this end, the selector 176 may, in one embodiment, receive input from any one or more of the antenna interface 153, the sensor interface 168, the network interface 172, and/or the user interface 174, and select appropriate modulation formats based on any one, or a combination, of such inputs. For example, a baseband modulation code module may be selected by the selector 176 responsive to a determination that the RFID reader 12 is operating in a low-density environment. Alternatively, should the selector 176, based on received inputs, determine that the RFID reader 12 is operating in a high-density and noisy RF environment, it may operatively select the non-baseband modulation code module to configure the controller 160 appropriately.

The selector 176 may also operate, based on the received inputs, to select various configuration parameters, also stored within the reader memory 162, for inclusion within commands (e.g., a query command) of a reader-to-tag transmission. The selection of one or more configuration parameters may be made based on input received via the sensor interface 168, indicating that the RFID reader 12 is operating in an environment that is subject to specific regulatory requirements (e.g., that the RFID reader 12 is operating in Europe, and accordingly the configuration parameters included within a query command issued from the RFID reader 12 should configure a population of RFID tags 14 to modulate a backscatter signal appropriately). Further, the controller 160 may execute an appropriate modulation code module so as to generate a demodulator clock signal 161, appropriate for demodulating a received backscatter signal that is modulated according to the selected modulation format and configuration parameters.

Finally, it should be noted that the various components of the RFID reader 12 discussed above may be accommodated within a common housing, or may alternatively be distributed across multiple devices. Further, the various components of the reader integrated circuit 150 need not, in alternative embodiments, be implemented on a single integrated circuit. For example, the reader memory 162 may of course be separate from a reader integrated circuit that includes the controller 160. While the sensor 170 is also shown to be accommodated within a common housing of the RFID reader 12 in FIG. 17, it will likewise be appreciated that the sensor 170 may be located and positioned externally, and coupled to the RFID reader 12.

Figure 18:
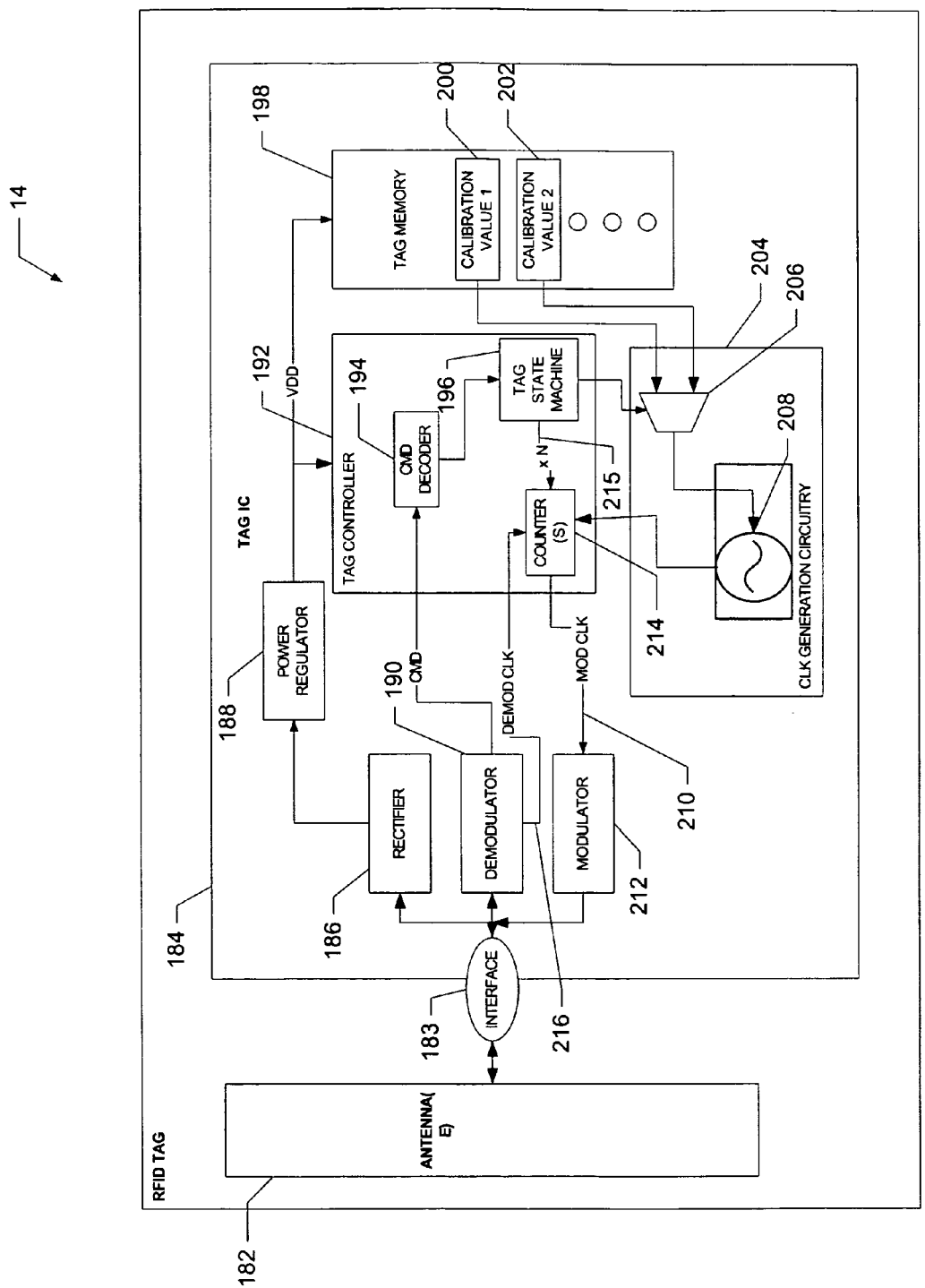
FIG. 18 is a block diagram providing architectural detail for an RFID tag, according to one exemplary embodiment.

FIG. 18 is a block diagram providing architectural detail for an RFID tag 14, according to one exemplary embodiment. The RFID tag 14 is shown to include one or more antennae 182, coupled to a tag integrated circuit 184 via an antenna interface 183 in the exemplary form of a pad. The tag interface 183 is in turn coupled to a rectifier 186, so as to enable an RF signal received via the antenna 182 to be propagated to the rectifier 186. The rectifier 186 extracts (or "scavenges") power from the received signal, the extracted power then being provided to a power regulator 188 that provides a reference voltage ($V_{DD}$) to various components of the tag integrated circuit 184. The antenna interface 183 is also coupled to a demodulator 190, so as to provide a received RF signal to the demodulator 190, which operationally demodulates the received signal to generate a command, and associated data values and configuration parameters. The demodulator 190 is shown to be coupled to a tag controller 192, and to provide commands, and the associated data and configuration parameters, to a command decoder 194. The command decoder 194 is coupled to a tag state machine 196, also included within the tag controller 192, and operationally decodes a command, responsive to which the command decoder 194 may instruct the tag state machine 196 to transition to a particular operational state.

The tag integrated circuit 184 also includes a tag memory 198, in which may be stored multiple calibration values 200, 202. The tag memory 198 is coupled to clock generation circuitry 204 that, in one embodiment, includes a multiplexer (MUX) 206 that operationally selects between the multiple calibration values 200, 202 stored within the tag memory 198 based on an output of the tag state machine 196. A state occupied by the tag state machine 196 may determine the output to the MUX 206, and accordingly may determine a calibration value selected by the MUX 206.

The MUX 206 is shown to be coupled to a Digitally Controlled Oscillator (DCO) 208 that is calibrated in accordance with a selected calibration value and provides a frequency signal to one or more counters 214 implemented within the tag controller 192. While a MUX 206 is described above as performing the selection operation, the selection may simply be part of a memory operation and any one of a number of memory access schemes may be utilized to select an appropriate calibration value. The counters 214, utilizing the frequency signal, are responsible for the generation of one or more clock signals that are propagated to other components of the tag integrated circuit 184. For example, the counters 214 may generate a modulator clock signal 210 that provides input to a modulator 212, and a demodulator clock signal 216 that provides input to the demodulator 190. The tag state machine 196 is also coupled to the counters 214 to provide a rate signal 215 that determines a multiplication rate (e.g., ×1, ×2 . . . , ×N) to be applied by the counters 214 in the generation of the modulator clock signal 210. The modulator clock signal 210, it will be appreciated, may operate as a "switch" signal according to which the modulator 212 varies the impedance of an antenna 182 to thereby modulate a backscatter signal transmitted from the RFID tag 14.

Figure 19:
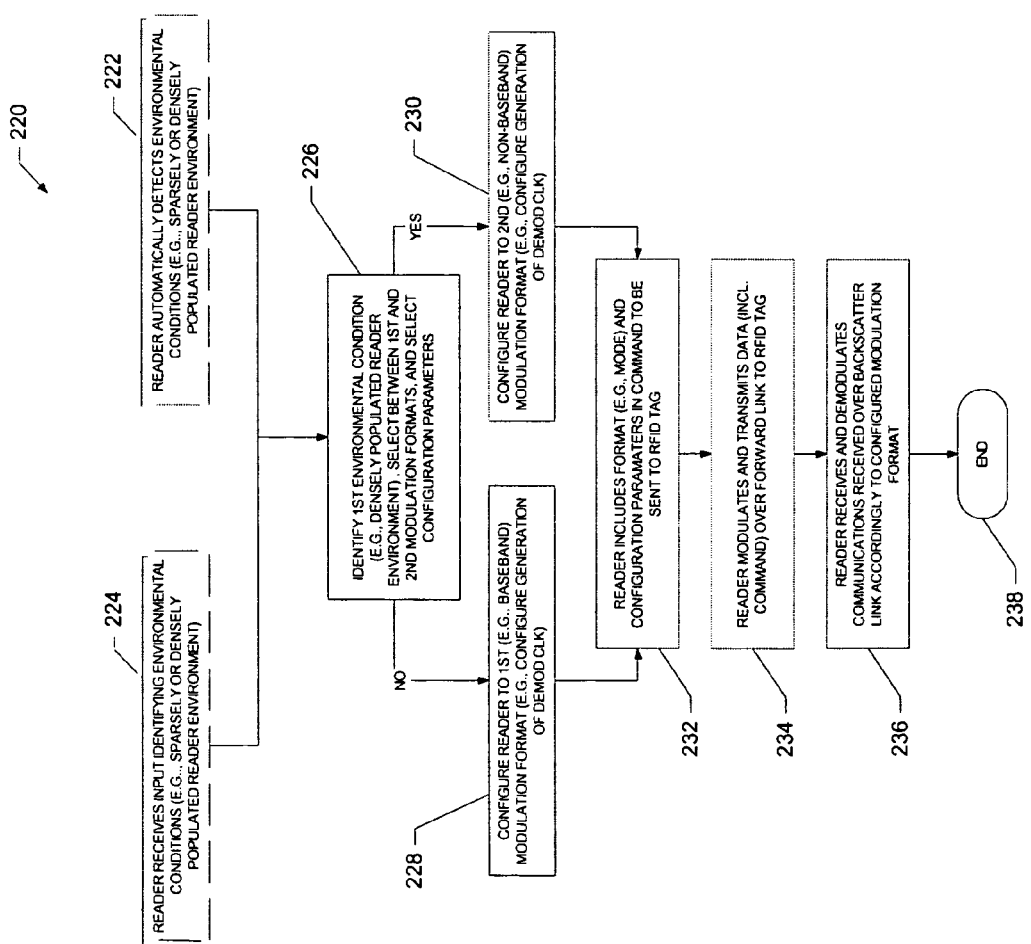
FIG. 19 is a flowchart illustrating an exemplary method to configure an RFID reader according to an environmental condition within a deployment environment.

FIG. 19 is a flowchart illustrating an exemplary method 220 to configure an RFID reader 12 according to an environmental condition pertaining to a deployment environment.

The method 220 commences with the receipt of an input, at the RFID reader 12, indicative of one or more environmental conditions that may be present within, or pertain to, an environment in which the RFID reader 12 is to be deployed. In one embodiment, the RFID reader 12 may, at block 222, automatically detect an environmental condition. For example, the detection of an environmental condition may involve the RFID reader 12 detecting that it is operating in either a sparsely or densely populated reader (or tag) environment, or a "noisy" environment in which a predetermined level of RF interference is present. To this end, the RFID reader 12 may, via an antenna 152 and an antenna interface 153, sample RF environmental conditions within a deployment environment, these samplings being provided to the selector 176 of the controller 160. The RFID reader 12 may also, via the antenna 152, receive a signal from a co-located RFID reader or a co-channel RFID reader, operating within the relevant environment. The transmission signals from the co-located or co-channel RFID reader are similarly propagated through to the selector 176 of the controller 160. The RFID reader 12 could of course, in other embodiments, employ other types of sensors to detect a variety of environmental conditions. For example, in one embodiment where the sensor 170 comprises a GPS receiver, the RFID reader 12 may automatically determine that it is operating at a specific geographic location at which certain environmental conditions are known to exist. One such environmental condition may be a regulatory condition under which RFID readers 12 are required to operate at the geographic location. For example, if the RFID reader 12 determines that it is operating within the North American continent or in Europe, this information may constitute an environmental condition that is automatically detected at block 222. In a further embodiment, as described in more detail below, the RFID reader 12 may also receive the signals from RFID, via the antenna 152, signals from RFID tags within a population of RFID tags 14 within an interrogated population backscatter signals from RFID tags 14 within an interrogated population. The backscatter signals may, for example, enable the RFID reader 12 to determine a tag population or density in the relevant environment. In yet another embodiment, the RFID reader 12 may receive an RF signal from a further RFID reader, a tab, or any other radio frequency device, and utilize the received RF signal and determine whether the received RF signal is below a predetermined threshold quality level. For example, where one or more received RF signals may be sufficiently degraded by interference from other signals that a subject RFID reader 12 is able to determine from one or more received RF signals that interference levels are above a threshold and that the quality levels of one or more signals are accordingly below a certain threshold quality level.

The RFID reader 12 may, at block 224, also or alternatively receive an input identifying a specific environmental condition from an external source. For example, the RFID reader 12 may be coupled, via a network interface 172, to a network, and accordingly to one or more other computer systems or sensors, that may provide the input identifying environmental conditions. For example, an external computer may operationally control a number of RFID readers 12 within a particular deployment environment, and accordingly be aware of the operational state of such further RFID readers 12. If other RFID readers 12 are in fact operational, this information, along with appropriate configuration parameters pertaining to such further RFID readers 12, may be communicated via the network interface 172 to the selector 176 of the controller 160. An external computer system may also, for example, provide information identifying a specific geographic location in which the RFID reader 12 is operating, or specific regulatory restrictions that are applicable within the deployment environment. An external computer system may also be equipped to detect RF noise and interference levels within the deployment environment, and to provide appropriate inputs to the RFID reader 12.

The input received at block 224, could also be manual input received via the user interface 174 of the RFID reader 12. For example, a user may manually indicate that the reader is operating under any one of a number of environmental conditions (e.g. a densely or sparsely populated environment).

The method 220 then progresses to block 226, where the reader controller 160, and specifically the selector 176, operates to identify one or more environmental conditions (e.g., a densely populated reader environment), and to select between multiple modulation formats to utilize for transmissions between the RFID reader 12 and the population of RFID tags 14, based on the identified environmental condition(s). Consider the example in which the RFID reader 12 determines that it is operating in a dense RFID reader environment. This determination may be made based on a prior determination that at least a threshold number of further RFID readers 12 are operating within a deployment environment. Accordingly, should, merely for example, more than three further RFID readers 12 be detected within the deployment environment, the selector 176 may identify the deployment environment as being a densely populated reader environment and select a modulation format accordingly. The RFID reader 12 may also determine that it is operating in a open "dense" RFID tag environment. This determination may be made, for example, based on a determination that an interrogated tag population equals or exceeds a predetermined population total or population density, within a particular environment. For example, the RFID reader 12 may perform a count of unique RFID tags 14 that back scatter responsive to an initial interrogation signal. Once the RFID reader 12 determines that a threshold number of RFID tags 14 are present within an interrogated population, the RFID reader 12 may identify deployment environment as being a densely populated environment, and also select a modulation format accordingly.

In a further embodiment, the RFID reader 12 may itself operate, or may alternatively receive input from other devices (e.g., external census or computer systems) indicating that the RFID reader 12 is operating in an environment in which RF noise levels and/or interference levels exceed a threshold level, this determination constituting the identification of a first environmental condition.

The selection of the modulation format may be based on any number of inputs to the selector 176. A detailed discussion regarding the desirability and advantages of using certain modulation formats within certain environments (e.g., sparsely versus densely populated environments) has been provided above. For example, the selector 176 may, upon determining that the RFID reader 12 is operating in a sparsely populated tag and/or reader environment, select a baseband modulation format for the modulation of backscatter communications. Alternatively, where the selector 176 determines that the RFID reader 12 is operating in a densely populated reader and/or tag environment, it may select a non-baseband (e.g., sub-carrier) modulation format for the modulation of backscatter signals within the deployment environment.

The selected baseband modulation format may be any one of a number of baseband modulation formats (e.g., biphase, FMØ, Manchester, and Pulse Width Modulation (PWM) or a line code modulation format). A selected non-baseband modulation format may be a subcarrier modulation format (e.g., a Frequency Shift Key (FSK), a Amplitude Shift Key (ASK) modulation format, or a Phase Shift Key (PSK) modulation format). The selection of the modulation format may include the consideration of any one or more of the inputs, received via one or more interfaces, of the RFID reader 12. For example, the selection of a particular modulation format may be based on noise and interference levels within the deployment environment, and also a geographic location in which the RFID reader 12 is operating.

At block 226, the selector 176, as mentioned above, may also select one or more configuration parameters according to which to configure RFID reader 12. For example, when operating within a North American environment, the configuration parameters may be selected such as to enable channel hopping, while a configuration parameter to disable this function may be selected if determined that the deployment environment is located in Europe. Similarly, if a determination is made at block 226 that the RFID reader 12 is operating within an European environment, a reader synchronization function of the RFID reader 12 may be enabled, whereas this feature may be disabled within a North American deployment environment.

Moving on from block 226, depending on whether a first or a second modulation format is selected at block 226, the method 220 progresses to block 228 or block 230. For the purposes of illustration only two modulation formats (broadly identified as first and second modulation formats) have been described. It will be appreciated that any number of modulation formats may be available for selection, and may in fact be selected, at block 226.

At block 228, the RFID reader 12 is configured according to the selected first modulation format by the controller 160. Where, for example, the first modulation format is a baseband modulation format, the controller 160 may retrieve the baseband modulation code from the associated reader memory 162 (or may retrieve appropriate configuration values from the memory 162) to configure the RFID reader 12. The configuration of the RFID reader 12 according to the baseband modulation format may involve selection of an appropriate counter (or counter algorithm) 167 to generate the demodulator clock 161 for demodulation of a backscatter signal modulated according to the selected baseband modulation format. The modulation format employed by the RFID reader 12 may be changed as well (e.g., a forward link modulation may be changed from double-sideband Manchester to single-sideband modulation in very dense reader environments).

Similarly, in the event that the second modulation format (e.g., a non-baseband modulation format) is selected at block 226, the method 220 progresses to block 230, where the RFID reader 12 is configured according to the second modulation format. This may again involve the retrieval of an appropriate non-baseband modulation code (or appropriate configuration parameters) from the reader memory 162, and generating (during tag-to-reader communications) the demodulator clock signal 161 to appropriately demodulate a backscatter signal that is modulated utilizing the selected non-baseband modulation format. The forward-link modulation format may also be changed, as discussed above.

Figure 21:
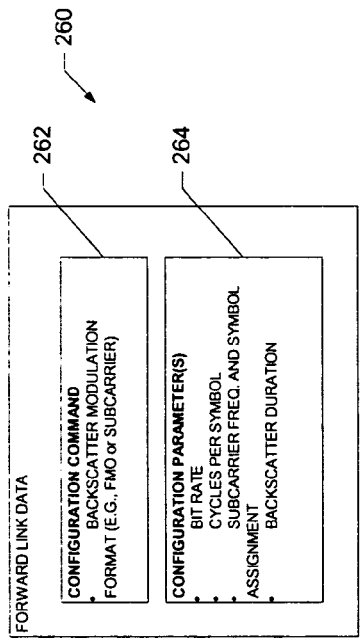
FIG. 21 is a diagrammatic representation of forward-link data that may be generated at an RFID reader.

At block 232, the RFID reader 12 includes modulation format (e.g., modulation mode) information, and appropriate configuration parameters in a command to be transmitted to a population of RFID tags 14. FIG. 21 is a diagrammatic representation of forward-link data 260 that may be generated at the RFID reader 12 at block 232. Specifically, the forward-link data 260 may include a configuration command 262 specifying a backscatter modulation format (e.g., an FMØ or subcarrier backscatter modulation format), as well as any one of a number of configuration parameters 264 (e.g., a bit rate, cycles per symbol, subcarrier frequency and symbol assignment or backscatter duration).

Figure 22:
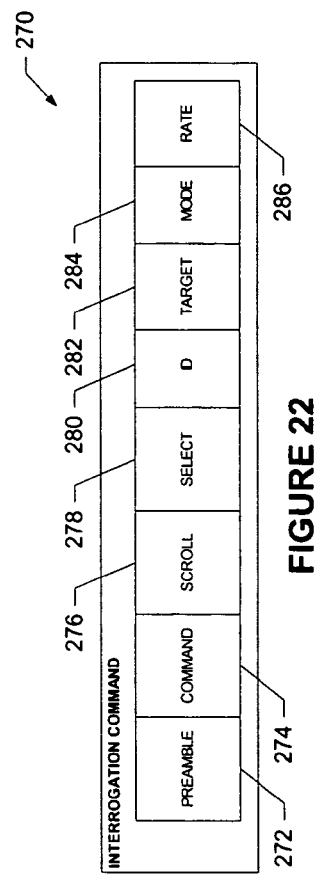
FIG. 22 is a block diagram providing further details regarding the structure and format of an exemplary configuration command, in the form of an interrogation command that may be issued from an RFID reader to a population of RFID tags.

FIG. 22 is a block diagram providing further details regarding the structure of an exemplary configuration command, in the form of an interrogation command 270. As illustrated, the interrogation command 270 may include a preamble 272; a command 274 (e.g., a query command); a scroll specifier 276, which sets an acknowledgement mode for the RFID tags; a select specifier 278 that may specify a tag population to respond to the command (e.g., the query command); an identifier 280 and a tag specifier 282 that further specify a tag population that is required to respond to the command; a mode specifier 284 that sets a backscatter mode (e.g., FMØ or subcarrier); and a rate specifier 286 that specifies a rate at which a tag should backscatter (e.g., ×1, ×2, ×4, etc.).

Returning to the method 220 as illustrated in FIG. 19, at block 234, the RFID reader 12 then modulates and transmits the forward-link data 260 over the forward-link to the population of RFID tags 14.

At block 236, the RFID reader 12 receives and demodulates communications (e.g., reply data) received over the backscatter link, the received data being modulated according to the selected backscatter modulation format specified in the forward-link data. As noted above, the RFID reader 12 is configured by the controller 160 to demodulate the received data by the generation of an appropriate demodulator clock signal 161.

Figure 23:
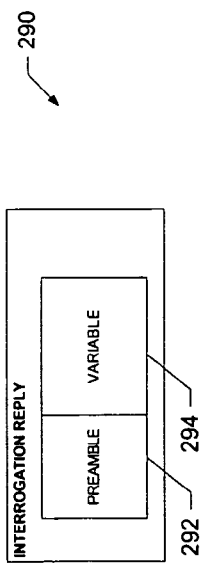
FIG. 23 is a block diagram illustrating an exemplary interrogation reply that may be received by an RFID reader from an RFID tag.

FIG. 23 is a block diagram illustrating an example of an interrogation reply 290 that may be received by the RFID reader 12 at block 236. The interrogation reply 290 is shown to include a preamble 292 and a variable 294 that may include identifier information stored by a responding RFID tag 14. The method 220 then terminates at block 238.

Figure 20:
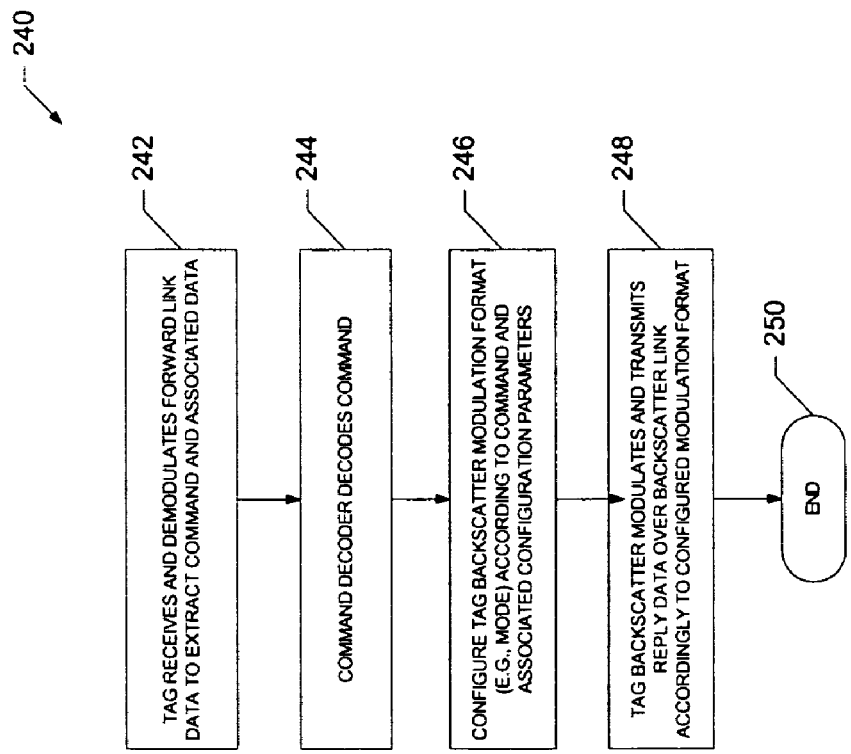
FIG. 20 is a flowchart illustrating a method, according to an exemplary embodiment, to configure an RFID integrated circuit according to any one or more of a number of environmental conditions.

FIG. 20 is a flowchart illustrating a method 240, according to one embodiment, to configure an RFID integrated circuit, such as the tag integrated circuit 184 discussed above with reference to FIG. 18, according to any one or more of a number of environmental conditions.

At block 242, an RFID tag 14 (of which the tag integrated circuit 184 is a component) receives and demodulates forward-link data 260 to extract a configuration command 262, and associated configuration parameters 264. In an embodiment where the RFID tag 14 is a "passive" tag, the tag 14 receives all operating energy from the radio-frequency signal that carries the forward-link data. Accordingly at block 242, the rectifier 186 may, as described above with reference to FIG. 18, extract operating energy from the received signal. At block 244, the demodulator 190, having extracted the command 262 and configuration parameters 264, communicates this data to the command decoder 194 of the tag controller 192, the command decoder 194 then decoding the relevant command.

At block 246, the tag controller 192, and specifically the tag state machine 196, configures a tag backscatter modulation format (e.g., mode) in accordance with the configuration command 262 and the configuration parameters 264. For example, where the mode specifier 284 included within an interrogation command 270 specifies an FMØ or subcarrier mode, and a rate specifier 286 specifies a specific rate, an appropriate calibration value may be selected from the tag memory 198, and an appropriate counter 214 set to generate a demodulator clock signal 216. For example, a rate signal 215 may be generated to configure the counter 214 to modulate at a specific (e.g., ×1, ×2, . . . ×N) rate.

At block 248, the RFID tag 14 then modulates a backscatter signal in accordance with the configuration, (e.g., by modulating the impedance of the antenna 182) and transmits reply data (e.g., an interrogation reply 290) over the backscatter link to the interrogating RFID reader 12. The method 240 then terminates at block 250. In the exemplary embodiment, an RFID system is described that operates in the 860 MHz–960 MHz frequency range (i.e., is an Ultra-High Frequency (UHF) system). In the exemplary embodiment, an RFID system is further described in which an RFID reader (or interrogator) communicates with and powers a population of passive RFID tags that are illuminated by a radio-frequency signal transmitted from one or more RFID readers. Reader/tag communications may be half-duplex (i.e., either the RFID reader talks and the RFID tags listen, or vice versa). In one embodiment, during the reader-to-tag communications, RFID readers communicate information to tags utilizing Amplitude Shift Key (ASK) modulation of a radio-frequency signal transmitted from the RFID reader. Passive RFID tags extract all operating energy from a received radio-frequency signal. During the tag-to-reader communications, the RFID reader transmits a Continuous Wave (CW) radio-frequency signal to the population of RFID tags. Each of the RFID tags within the illuminated population communicates information back to the RFID reader by modulating impedance (or reflection coefficient) of an associated antenna. The RFID reader observes communications from the RFID tag as amplitude-modulated backscatter of the CW signal.

It should also be noted that embodiments of the present invention may be implemented and not only as a physical circuit or module (e.g., on a semiconductor chip) but, also within a machine-readable media. For example, the algorithms, circuits and designs described above may be stored upon, or embedded within, a machine-readable media associated with a design tool used for designing semiconductor devices. Examples include a netlist formatted in the VHSIC Hardware Description Language (VHDL), the Verilog language, or the SPICE language. Some netlist examples include a behavioral level netlist, a register transfer level, (RTL) netlist, a gate level netlist, and a transistor level netlist. Machine-readable media include media having layout information, such as a GDS-II file. Furthermore, netlist files and other machine-readable media for semiconductor chip design may be used in a simulation environment to perform any one or more methods described above. Thus it is also to be understood that embodiments of the present invention may be used, or to support, a software program executing on some processing core (e.g., a CPU of a computer system), or otherwise implemented or realized within a machine-readable medium. A machine-readable medium may include any mechanism for storing and transmitting information in a form readable by a machine (e.g., a computer). For example, a machine readable-readable medium may comprise a read-only memory (ROM), a random access memory (RAM), magnetic disc storage media, optical storage media, flash memory devices, electrical, optical, acoustic, or other form of propagated signal (e.g., a carrier wave, infrared signal, radio-frequency signal, a digital signal, etc.).

One embodiment also extends to a machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be an RFID reader, an RFID tag, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. The term "machine" shall also be taken to include any collection of machines that individually or jointly execute a set (or multiple sets) of instructions to perform any one or more of the methodologies discussed herein.

The machine may further include machine-readable medium on which is stored one or more sets of instructions and data structures (e.g., software) embodying or utilized by any one or more of the methodologies or functions described herein. The software may also reside, completely or at least partially, within a memory and/or within the processor during execution thereof by the machine, the main memory 19 and the processor also constituting examples of machine-readable media.

The software may further be transmitted or received over a network via a network interface device utilizing any one of a number of well-known transfer protocols.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and an apparatus to configure an RFID system to be adaptable to a plurality of environmental conditions have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An RFID reader adapted to communicate with RFID tags, comprising:
   an interface to receive an input at the RFID reader indicating at least one of a plurality of conditions pertaining to an environment of the reader, the conditions being one of a number of RFID tags in the environment, a number of other readers operating in the environment, and whether another reader operates at a frequency in a similar channel as the reader;

a controller to select one of a plurality of modulation formats based on the input; and an antenna for communicating with the tags according to the selected format.

2. The RFID reader of claim 1, in which a different one of the modulation formats is selected depending on whether or not the number of tags in the environment exceeds a threshold.

3. The RFID reader of claim 1, in which a different one of the modulation formats is selected depending on whether or not the number of readers in the environment exceeds a threshold.

4. The RFID reader of claim 1, in which a different one of the modulation formats is selected depending on whether or not another reader has a frequency in a similar channel as the reader.

5. The RFID reader of claim 1, in which the selected modulation format corresponds to selecting at least one of a group of configuration parameters for the reader including a bit rate, cycles per symbol, subcarrier frequency, symbol assignment, and backscatter duration.

6. The RFID reader of claim 1, further comprising:

a demodulator, and wherein the controller is adapted to configure the demodulator to demodulate a signal that is backscattered from at least one of the tags according to the selected format.

7. The RFID reader of claim 1, in which the antenna is adapted to transmit to the tags a signal for configuring the tags to backscatter by modulating according to the selected format.

8. The RFID reader of claim 1, in which configuring the tags includes causing the tags to select at least one of a group of configuration parameters including a bit rate, cycles per symbol, subcarrier frequency, symbol assignment, and backscatter duration.

9. The RFID reader of claim 1, in which the plurality of modulation formats includes at least one of a FMØ, a Manchester, a pulse width modulation (PWM), a frequency shift key (FSK), an amplitude shift key (ASK), and a phase shift key (PSK) modulation format.

10. The RFID reader of claim 1, in which the interface is a user interface, and the input is manually provided to the RFID reader by a user.

11. The RFID reader of claim 1, in which the interface is a network interface to a further computer system, and the input is received via a network from the further computer system.

12. A method for an RFID reader to communicate with a plurality of RFID tags comprising:

receiving an input indicating at least one of a plurality of conditions pertaining to an environment of the reader, the conditions being one of a number of the RFID tags in the environment, a number of other readers operating in the environment, and whether another reader operates at a frequency in a similar channel as the reader;

selecting one of a plurality of modulation formats responsive to the input; and communicating with the tags using the selected modulation format.

13. The method of claim 12, in which a different one of the modulation formats is selected depending on whether or not the number of tags in the environment exceeds a threshold.

14. The method of claim 12, in which a different one of the modulation formats is selected depending on whether or not the number of readers in the environment exceeds a threshold.

15. The method of claim 12, in which a different one of the modulation formats is selected depending on whether or not another reader has a frequency in a similar channel as the reader.

16. The method of claim 12, in which the selected modulation format corresponds to selecting at least one of a group of configuration parameters for the reader including a bit rate, cycles per symbol, subcarrier frequency, symbol assignment, and backscatter duration.

17. The method of claim 12, further comprising:

configuring a demodulator of the reader to demodulate a signal that is backscattered from at least one of the tags according to the selected format.

18. The method of claim 12, further comprising:

configuring the tags to backscatter using the selected modulation format.

19. The method of claim 18, in which configuring the tags includes causing the tags to select at least one of a group of configuration parameters including a bit rate, cycles per symbol, subcarrier frequency, symbol assignment, and backscatter duration.

20. The method of claim 12, in which the plurality of modulation formats includes at least one of a FMØ, a Manchester, a pulse width modulation (PWM), a frequency shift key (FSK), an amplitude shift key (ASK), and a phase shift key (PSK) modulation format.

21. The method of claim 12, in which the input is manually inputted by a user in a user interface, and received via the interface.

22. The method of claim 12, in which the input is inputted by a computer system in a network interface, and received via the interface.

* * * * *